(12) United States Patent
Snawerdt

(10) Patent No.: US 6,594,055 B2
(45) Date of Patent: *Jul. 15, 2003

(54) SECURE FIBER OPTIC TELECOMMUNICATIONS SYSTEM AND METHOD

(75) Inventor: Peter Snawerdt, Melbourne Beach, FL (US)

(73) Assignee: Oyster Optics, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/765,153

(22) Filed: Jan. 17, 2001

(65) Prior Publication Data

US 2002/0093713 A1 Jul. 18, 2002

(51) Int. Cl.⁷ .......................... H04B 10/12; H04B 10/04
(52) U.S. Cl. ....................... 359/173; 359/183; 359/154; 359/156; 359/158; 359/161
(58) Field of Search ................. 359/173, 183, 359/154, 156, 158, 161; 380/21

(56) References Cited

U.S. PATENT DOCUMENTS

| | | | |
|---|---|---|---|
| 4,824,201 A | 4/1989 | Kazovsky | 380/96.16 |
| 5,223,967 A | 6/1993 | Udd | 359/119 |
| 5,319,438 A | 6/1994 | Kiasaleh | 356/345 |
| 5,455,698 A | 10/1995 | Udd | 359/119 |
| 5,543,952 A * | 8/1996 | Yonenaga et al. | 359/181 |
| 5,577,087 A | 11/1996 | Furuya | 375/377 |
| 5,606,446 A | 2/1997 | Davis et al. | 359/173 |
| 5,625,479 A * | 4/1997 | Suzuki et al. | 359/135 |
| 5,726,784 A | 3/1998 | Alexander et al. | 359/125 |
| 5,745,613 A | 4/1998 | Fukuchi et al. | 385/24 |
| 5,757,912 A | 5/1998 | Blow | 380/21 |
| 5,793,512 A | 8/1998 | Ryu | 359/179 |
| 5,896,211 A | 4/1999 | Watanabe | 359/124 |
| 5,953,139 A * | 9/1999 | Nemecek et al. | 359/124 |
| 5,953,421 A * | 9/1999 | Townsend | 380/21 |
| 6,072,615 A | 6/2000 | Mamyshev | 359/183 |
| 6,097,525 A * | 8/2000 | Ono et al. | 359/181 |
| 6,122,086 A | 9/2000 | Djupsjoebacka | 359/181 |
| 6,124,960 A | 9/2000 | Garthe et al. | 359/181 |
| 6,215,565 B1 | 4/2001 | Davis et al. | 359/110 |
| 6,243,505 B1 | 6/2001 | Bosso et al. | 385/2 |
| 6,256,130 B1 | 7/2001 | Bülow | 359/173 |
| 6,404,528 B1 | 6/2002 | Pfeiffer | 359/189 |

* cited by examiner

Primary Examiner—Leslie Pascal
Assistant Examiner—David C. Payne
(74) Attorney, Agent, or Firm—Davidson, Davidson & Kappel, LLC

(57) ABSTRACT

A secure fiber optic data transmission system includes a transmitter having a light source, a phase modulator for phase modulating the light source, and a controller for controlling the phase modulator as a function of an input electronic data stream and a second electronic data stream having a delay, the phase modulator creating a phase-modulated optical signal. An optical fiber receives the optical signal and a receiver receives the optical signal from the optical fiber. The receiver has a splitter for splitting the optical signal into a first path and a second path. The second path has a second path length longer than the first path length, the second path length being a function of the delay in the second electronic data stream.

27 Claims, 4 Drawing Sheets

← time

DSI   010100111011010111110110101110 1

A     010000110110111001101011100100 — 64
B     010100111011010111110110101110 1

OP    000100001101101100110110111001
OPD   010000110110111001101101110 01__

DSO   010100111011010111110110101 11__

FIG. 4

←time

DSI 0101001110110101111101101011101

A 0001011000111011001110001001110 ←64
B 0101001110110101111101101011101

OP 010001011000111011001110001001 1
OPD 000101100011101100111000100 11 __

DSO 0101001110110101111101101010111 __

FIG. 5

SECURE FIBER OPTIC TELECOMMUNICATIONS SYSTEM AND METHOD

BACKGROUND OF THE INVENTION

1. Field of the Invention

The present invention relates generally to telecommunications and more particularly to improving security and data transmission over fiber optic networks.

2. Background Information

In current fiber optic networks, an electronic data stream is fed to a laser amplitude modulator. The laser amplitude modulator typically pulses or alters the laser output to create an amplitude-modulated optical signal representative of the electronic data stream. The laser amplitude modulator and laser thus define a transmitter for transmitting the optical signal over an optical fiber, which is then received by a receiver. The receiver for the amplitude-modulated optical signals of the optical data typically includes a photodiode to convert the optical signals back into the electronic data stream.

The reading of the amplitude-modulated optical data signals using a photodiode is straightforward: the optical signals either produce an electric output at the photodiode or they do not. As a result, an output electronic data stream of zeros and ones is generated.

However, optical fiber may be tapped. The optical fibers can be spliced or even merely clamped so as to obtain optical signals from the fiber. It also may be possible to tap fibers without physically touching the optical fiber, for example by reading energy emanating or dissipating along the fiber. Amplitude-modulated optical signals, with their ease of detection from a photodiode, require that only a small amount of energy be tapped and passed through the photodiode in order to be converted into a tapped electronic data stream.

To confront non-secure optical and non-optical data lines, it has been known to use public key/private key encryption so that the data stream being transmitted is encoded in a format that makes it difficult to decode. Encryption however has several drawbacks, including the need for extra processing steps and time. Moreover, public key/private key encrypted data can be cracked, and the devices and algorithms for doing so are constantly improving.

U.S. Pat. No. 5,455,698 purports to disclose a secure fiber optic communications system based on the principles of a Sagnac interferometer. A data transmitter is a phase modulator for modulating counter-propagating light beams sent by a receiver round a loop. The receiver includes a light source, a beamsplitter for splitting light from the light source into counter-propagating light beams and for receiving the phase-modulated light beams, and an output detector. U.S. Pat. No. 5,223,967 describes a similar Sagnac-interferometer-based system operating over a single optical fiber.

The Sagnac-interferometer-based systems described in these patents have the disadvantage that they require the light to travel over a loop, whether back and forth in a single fiber or over a long length looped fiber. As a result, either the link budget for the single fiber must be doubled, reducing the data carrying capacity for a single fiber, or else a looped fiber with significant and expensive extra length of at least twice that of a single fiber must be laid between the transmitter and the receiver. Moreover, the receiver contains the light source, as opposed to the current installed base where the transmitter has the light source.

The Sagnac-interferometer-based systems thus are expensive to build and operate, and do not work particularly well with existing systems.

U.S. Pat. No. 6,072,615 purports to describe a method for generating a return-to-zero optical pulses using a phase modulator and optical filter. The RZ-pulse optical signal transmitted over the fiber is easily readable by a detector.

U.S. Pat. No. 5,606,446 purports to describe an optical telecommunications system employing multiple phase-compensated optical signals. Multiple interferometric systems are combined for the purpose of multiplexing various payloads on the same optical transmission path. The patent attempts to describe a method for providing fiber usage diversity using optical coherence length properties and a complex transmit/receive system. Each transmitter has a splitter, a plurality of fibers and a plurality of phase modulators to create the multiplexed signal, which is then demultiplexed at the receiver. This system is complex and expensive.

SUMMARY OF THE INVENTION

An object of the present invention is to provide an improved security optical fiber transmission system and device. An alternate or additional object of the present invention is to provide high bandwidth optical data transport via transmission and recovery of phase-modulated optical signals. Yet another alternate or additional object of the present invention is to provide a simple yet secure phase-modulated optical data transmission system.

The present invention provides a fiber optic data transmission system comprising a transmitter having a light source, a phase modulator for phase modulating the light source and a controller for the phase modulator. The controller controls the phase modulator as a function of an input electronic data stream and a second electronic data stream employing a delay, so as to create an encoded phase-modulated optical signal in the light passing through the phase modulator. The system also includes an optical fiber receiving the optical signal and a receiver receiving the optical signal from the optical fiber. The receiver includes a splitter for splitting the optical signal into a first path and a second path. The second path has a second path length longer than the first path length, the second path length being a function of the delay in the second electronic data stream. The receiver also includes a coupler for coupling the first path and the second path together so as to create an optical output signal.

With the system of the present invention, the receiver functions as an interferometer. An attempt to read the optical signal in the fiber, for example from a tap, requires knowledge of the delay and the creation of a precise physical delay path in the interferometer. Optical detectors with photodiodes do not have the bandwidth to measure the phase-modulated optical signal directly, since photodiodes are only capable of determining whether or not light is present.

The interferometer of the receiver of the present invention requires a significant amount of light to pass through the splitter and coupler, so that a tap would have to remove a significant amount of energy from the optical fiber in order to resolve the optical signal without a significant bit error rate. Detection of a tap on the system of the present invention, for example through a detection device reading a level of light energy in the fiber, becomes almost certain.

Moreover, the tap would have to match the interferometer delay in the second path to the electronic delay imposed by the controller, which is not always known.

The controller preferably includes an exclusive-or gate function, the input data stream being fed to an input of the exclusive-or gate and the second data stream being an input of the exclusive-or gate and a function of the output of the exclusive-or gate. The second data stream thus runs in a feedback circuit, which preferably includes a delay circuit delaying the second data stream by an amount of time directly proportional to the bit rate. As such, the controller may comprise a delayed-feedback exclusive-or gate.

The delay circuit may delay the second data stream by an amount of time directly proportional to a predetermined number of bits. When the data rates are at 155 Mb/sec (OC-3) or higher, the amount of delay preferably is greater than one bit. However, for data rates below OC-3, the electronic delay can be a fraction of the bit time, as long as the fraction is a power of two, for example one-half, one-quarter, one-eighth, etc. The fractional delay permits the present system to run relatively low data rates, such as T1, without requiring a long coherence length source.

The light source preferably is a continuous wave laser, for example a semiconductor laser operating at approximately 1550 nm or other wavelengths. The transmitter of the present invention requires only one phase modulator, and can operate at speeds of up to 10 Gb/s and even faster.

The receiver may include a detector for converting the output optical signal into an electronic output data stream. Preferably, the path length difference between the first path length and second path length is a function of the delay and the speed of the light in the fiber. The distance delays the light traveling in the second path with respect to light in the first path by a second delay, the second delay preferably being equal to the delay imposed at the controller. The second delay may vary slighty from the first delay, as long as the detector at the detector can read the output signal. The actual permissible difference will depend on the light source and any electronic filtering of the output signal.

The system preferably includes a detector for detecting a tap or loss of energy in the optical fiber. Most preferably, the detector is an energy sensor, which may or may not include programmable "trip" levels, which can monitor the amplitude of the light in the fiber. If a tap occurs, it must couple off a significant amount of energy to pass through an interferometer with a low bit error rate, thus making detection of the tap by the detector highly likely.

Depolarizers preferably are located between the light source and the phase modulator, and in the first path of the receiver. The depolarizer in the receiver alternatively may be in the second path.

The present invention also provides a transmitter comprising a light source, a phase modulator for phase modulating the light source, and a controller controlling the phase modulator, the controller including a delayed-feedback exclusive-or gate.

In addition, the present invention also provides a receiver comprising an interferometer, the interferometer having a first path and a second path propogating light at a delay with respect to the first path, the delay being a function of a delay imposed by a phase-modulator controller in a light-emitting transmitter.

A method for transmitting secure data is also provided comprising the steps of:

transmitting light from a light source in a transmitter;

electronically imposing a delay on an electronic data stream; and phase modulating the light in the transmitter as a function of the selected delay and an electronic data input stream.

Preferably, the phase modulated data is a function of an output of a delayed-feedback exclusive-or gate.

The method further may include receiving optical signals in a receiver, splitting the optical signals into a first and second path and imposing a second delay on light in the second path with respect to light in the first path. The second delay is a function of the electronically-imposed delay and most preferably is equal to the electronically-imposed delay. The first and second paths then are recombined so as to generate an output optical signal, which may be read by an optoelectronic detector.

The method preferably includes monitoring a fiber for intrusion. The monitoring preferably includes monitoring an energy level in the fiber with programmable trip levels.

BRIEF DESCRIPTION OF THE DRAWINGS

A preferred continuous-wave laser embodiment of the present invention is described below by reference to the following drawings, in which:

FIG. 4 shows details of an electronic data stream and the respective phase-modulated optical signals of the present invention, in representative binary form; and FIG. 5 shows details of other electronic data streams and phase-modulated optical signals of the present invention, in representative binary form.

DETAILED DESCRIPTION

Figure 1:
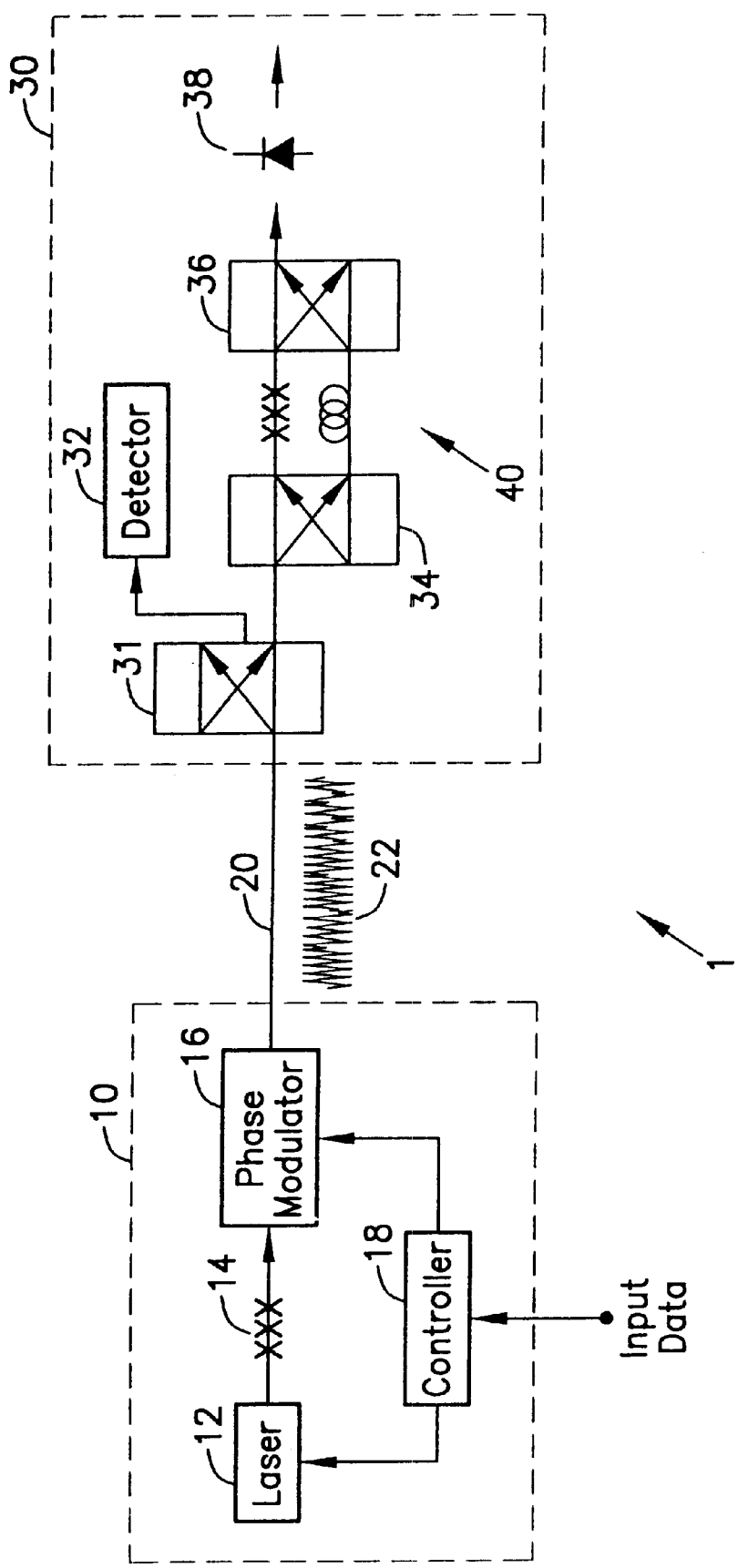
FIG. 1 shows a schematic of the system of the present invention.

FIG. 1 shows a preferred embodiment of a secure telecommunications system 1 according to the present invention. The system 1 includes a transmitter 10, an optical fiber 20, and a receiver 30. Transmitter 10 includes a continuous wave coherent laser 12, for example a semiconductor laser emitting a narrow band of light at approximately 1550 nm, or at other wavelengths. Light emitted from laser 12 is depolarized by a depolarizer 14 and passes through a phase modulator 16, for example a Mach-Zender phase modulator. An electronic controller 18, for example a PLC, controls phase modulator 16. Controller 18 is also programmable to control the optical power output of light emitted by laser 12. Preferably, the power output is set as low as possible for a given optical span, while maintaining a low bit error rate. This reduces the light available for any tap.

Figure 3:
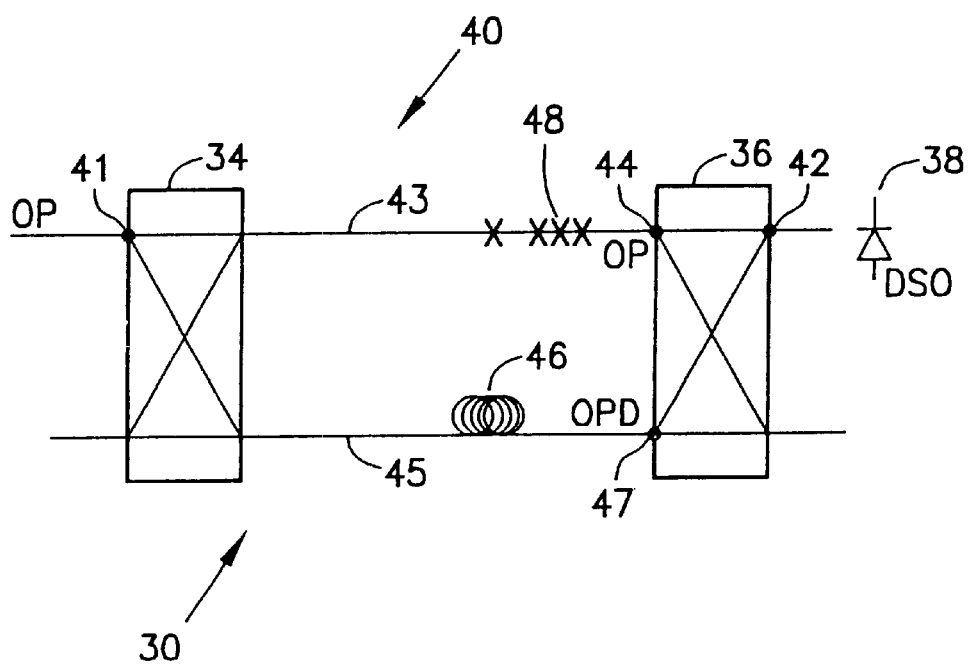
FIG. 3 shows in a larger view the interferometer FIG. 1.

Depending on the controller output, phase modulator 16 either imparts no phase shift to the light or a 180-degree phase shift on the light passing through phase modulator 16, thus creating an optical signal 22, which represents a stream of binary bits. Optical signal 22 is transmitted over fiber 20 to receiver 30. Receiver 30 includes a coupler/splitter 31, functioning as a splitter, a light monitoring detector 32, a coupler/splitter 34, functioning as a splitter, and a coupler/splitter 36, functioning as a coupler. The coupler 34 and splitter 36 together define part of an interferometer 40, as will be described with reference to FIG. 3.

Figure 2:
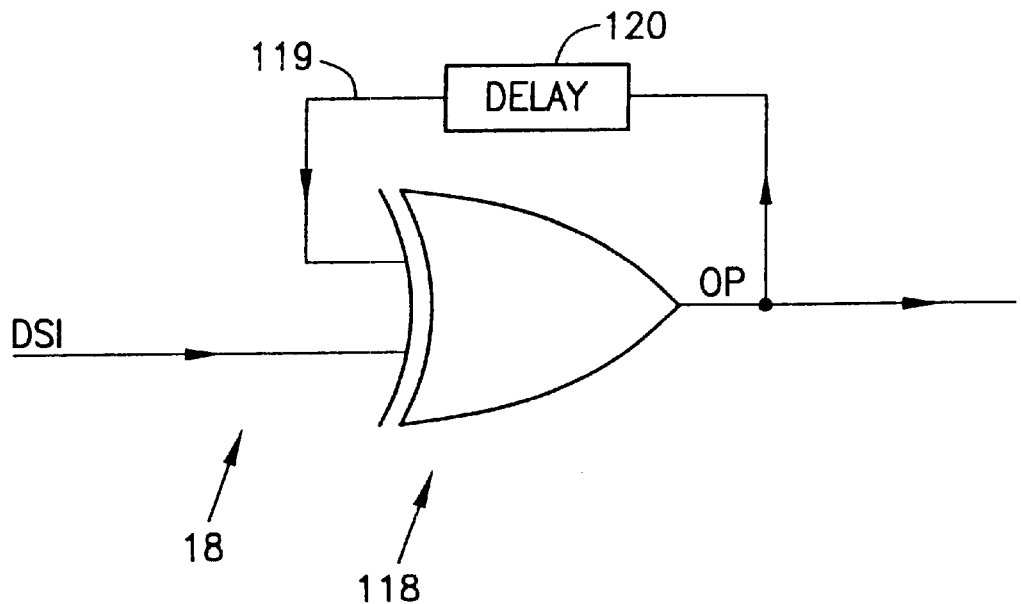
FIG. 2 shows details of the circuit of the controller of FIG. 1.

FIG. 2 shows a schematic of part of the circuitry of controller 18 of FIG. 1. Input data identified as DSI forms an input B of an exclusive-or gate 118. The other input A of the exclusive-or gate 118 is a feedback loop 119, which feeds back the output of exclusive-or gate 118, and provides an electronic delay circuit 120, which causes output OP to arrive at input A with a delay, for example, a certain number of bits later. Exclusive-or gate 118 thus is a delayed-feedback exclusive-or gate, which outputs an output electronic data stream OP for controlling phase modulator 16. Phase modulator 16 phase modulates the light output from the laser 12 based on the electronic data stream OP. Optical signal 22 in FIG. 1 thus corresponds to the data in electronic data stream OP.

Optical signal 22 of FIG. 1, which preferably has a constant maximum amplitude, then passes to receiver 30. Splitter 31 splits off a portion of the light, directing part of the optical energy to the light monitoring detector 32 and passing the remaining light to the interferometer 40. A detector 32, for example a light energy detector, monitors the light energy in the fiber 20 via the light energy coupled to the detector by splitter 31, the light energy being a function of the amplitude. If the amplitude drops, most likely from a tap, the detector alerts the receiver and can, for example, sound an alarm or alert network maintenance personnel. Additionally, since the receiver is generally part of a component box, which also includes a transmitter, the component box transmitter can send a signal back to the component box containing transmitter 10 so as to instruct transmitter 10 to stop sending data, or to send data over a standby fiber. Detector 32, while preferably part of receiver 30, also could be located separately from receiver 30, for example where fiber 20 enters a building or other secure environment.

Optical signal 22 after passing splitter 31 then enters interferometer 40 at an input 41 of splitter 34. Splitter 34 splits the light entering input 41, so that the signal OP travels over both a first fiber 43 and a second fiber 45. A depolarizer 48 may depolarize light passing through fiber 43, preferably, or fiber 45 as an alternative. Second fiber 45 includes a delay fiber 46 which may include a fiber loop of a desired length. Delay fiber 46 then provides an input to coupler 36 which recombines the delayed signal with the non-delayed signal propagating through fiber 43 and depolarizer 48 at output 42. The physical delay imposed by the interferometer 40 in the second light path through fiber 45, with its delay loop 46, with respect to light passing through the first light path through fiber 43 and depolarizer 48 is selected to match as closely as possible an electronic delay time ED imposed by electronic delay circuit 120 of the controller 18. If the first path in the interferometer 40 has a length L1 and the second path a length L2, the length L2 is selected, preferably by sizing loop 46, as a function of L1, the speed of light v in fibers 43 and 45, the light propagation delay through the depolarizer 48, DPD, and the electronic delay time ED. The speed of light in the fibers may be estimated as a function of the wavelength and the type of fiber used. The length L1 is known. When depolarizer 48 is in path 43, L2 is then chosen to approximate, and preferably equal, the amount (ED+DPD)*v+L1. The actual permissible difference between the two amounts depends on the light source and the accuracy of any electronic filtering of the output signal.

The light recombining at output 42 thus recombines the signal OP with a delayed signal OPD, delayed by an amount of time equivalent to the electronic delay time ED. If the data in the OP and OPD signals each represents a zero, or each represents a one, at the inputs 44 and 47 to coupler 36, the signals will destructively interfere when recombined at output 42 of coupler 36. Output detector 38 then detects no light and a produces a zero signal. If one of the data bits in the OP and OPD signals represents a zero and the other one represents a one, at the inputs 44 and 47 to coupler 36, the signals will constructively interfere when recombined at coupler output 42. Output detector 38 then detects light and produces an electronic signal representative of a one.

The interferometer 40 comprising coupler/splitter 34 and 36, fibers 43 and 45, delay fiber 46, and depolarizer 48 thus functions as an optical exclusive-or gate with one input leg delayed for signals arriving at input 41 of coupler 34. Interferometer 40 as a whole thus optically and physically "decodes" the signal OP produced by the delayed-feedback exclusive-or gate 118 of FIG. 2.

FIG. 4 shows a schematic example of the functioning of the system 1 with a two-bit delay imposed by delay circuit 120. The electronic data stream input DSI is also the input B for exclusive-or gate 118. The first two delayed bits from input A are determined by the previous two bits in stream B, and as will be demonstrated with respect to FIG. 5, do not affect the functioning of the system 1. Assuming for purposes of FIG. 4 that the delayed bits 64 entered input A as zero and zero, the output OP is as shown. Phase modulator 16 then converts this electronic data stream OP into optical signal 22 representative of OP. The interferometer 40 then creates delayed optical signal OPD, also delayed two bits from the optical signal representative of OP. At combiner 36, the two signals OP and OPD produce, at output 42 and photodiode detector 38, the data stream output DSO. As shown, input data stream DSI and output data stream DSO are the same after accounting for delay and initialization.

FIG. 5 shows the effect of having a different first two delayed bits 65 from input A on the same data stream input DSI of FIG. 4. While the data stream OP and OPD thus differ from those in FIG. 4, the resulting data stream output DSO is the same as in FIG. 4.

System 1 provides a secure method for transmitting data over a single optical fiber, which is difficult to decode if tapped, and also permits excellent detection of the existence of a tap.

What is claimed is:

1. A fiber optic data transmission system comprising:
a transmitter having a light source producing light, a phase modulator for phase modulating the light source, and a controller for controlling the phase modulator as a function of an input electronic data stream and a second electronic data stream having a delay, the controller having a controller output electronic data stream of a plurality of bits, each bit being either a binary zero or a binary one, the phase modulator creating a phase-modulated optical signal, for each bit the phase modulator imparting on the light for each binary zero of the controller output electronic data stream either a first phase corresponding to the binary zero or a second phase offset 180 degrees from the first phase corresponding to the binary one so as to create the phase-modulated optical signal, the transmitter having an optical output for the phase-modulated optical signal, the phase-modulated optical signal at the optical output being free of amplitude modulation as a function of the input electronic data stream;
an optical fiber receiving the optical signal; and
a receiver receiving the optical signal from the optical fiber, the receiver having a splitter for splitting the optical signal into a first path and a second path, with a path length difference between the first path and second path being a function of the delay in the second electronic data stream.

2. The system as recited in claim 1 wherein receiver further includes a coupler for coupling the first path and the second path together so as to create an optical output signal.

3. The system as recited in claim 1 wherein the controller includes an exclusive-or gate, the input data stream being fed to a first input of the exclusive-or gate and the second data stream being a second input of the exclusive-or gate and a function of an output of the exclusive-or gate.

4. The system as recited in claim 3 wherein the controller includes a delay circuit delaying the second data stream between the output and the second input by a certain number of bits.

5. The system as recited in claim 4 wherein the delay circuit delays the second data stream by a predetermined number of bits.

6. The system as recited in claim 1 wherein the light source is a continuous wave laser.

7. The system as recited in claim 1 wherein the transmitter for the fiber has a single phase modulator.

8. The system as recited in claim 2 wherein the receiver includes a detector for converting the output optical signal into an electronic output data stream.

9. The system as recited in claim 1 wherein the second path length is longer than the first path length by a distance, the distance being a function of the delay and the speed of light in the fiber.

10. The system as recited in claim 9 wherein the distance delays the light traveling in the second path with respect to light in the first path by a second delay, the second delay being equal to the delay imposed at the controller.

11. The system as recited as recited in claim 9 wherein the distance delays the light traveling in the second path with respect to light in the first path by a second delay, the second delay differing from the delay at the controller by an amount less than the coherence length of the light divided by the speed of the light in the fiber.

12. The system as recited in claim 11 further including a detector for detecting a tap or loss of energy in the optical fiber.

13. The system as recited in claim 12 wherein the detector is a light energy monitor.

14. The system as recited in claim 1 further comprising a first depolarizer between the light source and the phase modulator and a second depolarizer in at least one of the first path and second path of the receiver.

15. An optical data transmitter comprising:
a light source producing light;
a phase modulator for phase modulating light from the light source; and
a controller controlling the phase modulator, the controller including a delayed-feedback exclusive-or gate and having a controller output electronic data stream of a plurality of bits, each bit being either a binary zero or a binary one, the phase modulator creating a phase-modulated optical signal, for each bit the phase modulator imparting on the light for each binary zero of the controller output electronic data stream either a first phase corresponding to the binary zero or a second phase offset 180 degrees from the first phase corresponding to the binary one so as to create the phase-modulated optical signal, the transmitter having an optical output for the phase-modulated optical signal, the phase-modulated optical signal at the optical output being free of amplitude modulation as a function of the input electronic data stream.

16. The optical data receiver as recited in claim 15 further comprising a detector for detecting an energy level at an input of the receiver.

17. A method for transmitting secure data is also provided comprising the steps of:
transmitting light from a light source in a transmitter;
electronically imposing a delay on an electronic data stream;
phase modulating the light in the transmitter as a function of the imposed delay and an electronic data input stream so as to define a phase-modulated optical signal; and
sending the phase-modulated optical signal from the transmitter free of amplitude modulation as a function of the electronic data input stream.

18. The method as recited in claim 17 wherein the phase modulating step is a function of an output of a delayed-feedback exclusive-or gate.

19. The method as recited in claim 17 further comprising receiving optical signals in a receiver, splitting the optical signals into a first and second path and imposing a second delay on light in the second path with respect to light in the first path.

20. The method as recited in claim 19 wherein the second delay is a function of the electronically-imposed delay.

21. The method as recited in claim 20 wherein the second delay is equal to the electronically-imposed delay.

22. The method as recited in claim 19 further comprising recombining the first and second paths so as to generate an amplitude-varying output optical signal.

23. The method as recited in claim 22 further comprising converting the output optical signal into an electronic data output stream.

24. The method as recited in claim 17 further including monitoring a fiber for intrusion.

25. The method as recited in claim 24 wherein the monitoring step includes monitoring an energy level in the fiber.

26. The method as recited in claim 25 wherein the monitoring step further includes programming detection threshold levels.

27. A fiber optic data transmission system comprising:
means for phase modulating light as a function of an input electronic data stream and a second electronic data stream having a delay, thus creating a phase-modulated optical signal with encoded information for recovery, the means for phase modulating the light including an output for the phase-modulated optical signal, the phase-modulated optical signal at the optical output being free of amplitude modulation as a function of the input electronic data stream;
means for transporting the optical signal, the transporting means being operably connected to the phase modulating light means; and
means for receiving the optical signal from the transporting means, the receiving means including an interferometer having a path length difference which is a function of the delay in the second electronic data stream.

* * * * *